United States Patent [19]
Hidaka

[11] Patent Number: 5,872,558
[45] Date of Patent: Feb. 16, 1999

[54] METHOD AND SYSTEM IN A DATA PROCESSING SYSTEM FOR PROCESSING DATA UTILIZING A CURSOR HAVING MULTIPLE POINTING SPOTS

[75] Inventor: Kazuyoshi Hidaka, Kanagawa-ken, Japan

[73] Assignee: International Business Machines Corporation, Armonk, N.Y.

[21] Appl. No.: 664,884

[22] Filed: Jun. 17, 1996

Related U.S. Application Data

[63] Continuation of Ser. No. 339,868, Nov. 15, 1994, abandoned.

[30] Foreign Application Priority Data

Nov. 16, 1993 [JP] Japan ................................. 5-286387

[51] Int. Cl.$^6$ ........................................... G09G 5/08
[52] U.S. Cl. ............................................ 345/157; 345/145
[58] Field of Search ...................... 345/156, 157, 345/160, 163, 173, 179, 180, 182, 145; 178/18; 341/21, 22, 23; 463/31, 32, 37, 38, 39

[56] References Cited

U.S. PATENT DOCUMENTS

| | | | |
|---|---|---|---|
| 4,764,885 | 8/1988 | Greanias et al. ...................... | 178/18 |
| 4,806,916 | 2/1989 | Raskin et al. . | |
| 4,984,152 | 1/1991 | Muller . | |
| 5,299,307 | 3/1994 | Toung ................................... | 345/157 |
| 5,325,110 | 6/1994 | Tang et al. ............................ | 345/157 |

*Primary Examiner*—Chanh Nguyen
*Attorney, Agent, or Firm*—Anthony N. Magistrale; Martin McKinley; Andrew J. Dillon

[57] ABSTRACT

In a data processing system, an object is displayed on a display coupled to the data processing system. Also displayed, is a multiple-point cursor having at least first and second pointing spots. The multiple-point cursor is typically positioned by user manipulation of a pointing device, such as a mouse. In response to a user indication, such as a mouse click, a first operation is performed on the displayed object if the first pointing spot is positioned over the object during the mouse click. Similarly, a second operation is performed on the displayed object in response to a user indication while the second pointing spot of the multiple-point cursor is positioned over the object on the display. Such first and second operations may include a copy operation and a move operation.

24 Claims, 14 Drawing Sheets

$$Xi = X + delta\_x\_i$$
$$Yi = Y + delta\_y\_i$$

5,872,558

METHOD AND SYSTEM IN A DATA PROCESSING SYSTEM FOR PROCESSING DATA UTILIZING A CURSOR HAVING MULTIPLE POINTING SPOTS

This is a continuation of application Ser. No. 08/339,868, filed Nov. 15, 1994, now abandoned.

BACKGROUND OF THE INVENTION

1. Technical Field

The present invention relates in general to an improved data processing system having a display and a pointing device, such as a mouse or a track ball, and in particular to a data processing system in which a pointing device indicates an object displayed on a display and performs a predetermined operation on the object.

2. Description of the Related Art

In known data processing systems having a graphic user interface (GUI), it is common to perform a predetermined operation on an object displayed on a display, where such an object may include an icon, a graph, a window frame, or a character. Such predetermined operations may include an actuation of a program associated with an icon, an expansion of a window, or moving a window. These predetermined operations may be accomplished by positioning a mouse cursor and clicking or double clicking a mouse button, or clicking and dragging the displayed object.

Along with the complication of GUI application programs, operations that may be performed on an object on a display have become diversified. To cope with the diversification of such operations, attempts have been made in the prior art to improve the user interface, and to improve the efficiency of the various operations.

PUPA 59-163666 discloses a graphic generator using multiple cursors that forms a cursor area in an area surrounding part of a graphic pattern, moves in a voluntary direction a graphic surrounded by the cursor area, and further adds or contracts the graphic along with the movement of the graphic.

PUPA 62-11927 discloses a calculator using an icon for display and selection of functions, where the functions possessed by each icon, the icon's position on the screen, the icon's shape, and menu data displayed when the icon is displayed are stored and controlled to display the content of menu data when an icon for controlling the cursor display is selected.

PUPA 62-259129 discloses an indication means for indicating voluntary two pointing spots with a relative distance therebetween on a tablet, and cursor control means for moving a graphic cursor displayed on a display following the movement of the graphic cursor between the two pointing spots, as well as changing the size of the graphic cursor in response to pressing a predetermined button.

PUPA 2-166506 discloses an information input apparatus that displays a cursor on a display screen in response to the operation of a pointing device, the cursor serving as a shape for representing the function of an operation means.

PUPA 4-34663 discloses a function for representing the scope of an object to be selected with a cursor for selecting and editing an object on a display, as well as allowing variation of the shape and size of the cursor for representing the scope of an object to be selected.

While the prior art discloses changing the shape and size of a mouse cursor in accordance with a different operation, the cursor serves only to select one object. Consequently, when an attempt is made to perform one of a plurality of possible operations, for example, the following processing steps will be followed:

(a) A specific object is selected by positioning a mouse cursor on the specific object and clicking a mouse button. At this time, the specific object changes color, inverts its display, and becomes shaded to indicate that it has been selected. However, the operation that is to be performed has not yet been established, and therefore, the operation is not performed on the object at this stage.

(b) Then the menu on the upper part of the window is clicked to display a pull-down menu.

(c) A desired operation menu is clicked from among a plurality of operation menus displayed in the pull-down menu. As a consequence, the desired operation is performed on the selected object.

Such an operation, however, requires many operation steps using a mouse cursor. The operation is thus inefficient. There is also known a method of performing a specific operation with a combination of a control key and the right button of the mouse as a short cut key to cope with the above operation. Users are obliged to memorize a specific key stroke. Such a method is also lacking in flexibility in the user interface.

SUMMARY OF THE INVENTION

It is therefore an object of the present invention to provide a method and apparatus for processing data wherein a mouse cursor is used on an object displayed on a display screen to enable one of a plurality of operations to be selectively performed with a minimum number of operation steps.

It is yet another object of the present invention to provide a method and system for using a mouse cursor to selectively subject an object displayed on a screen to one of a plurality of operations with a minimum number of steps.

The above, as well as additional objects, features, and advantages of the present invention, are attained by using a multiple-pointing-spot cursor on an object in accordance with the method and system of the present invention. First, the move operation of the object is designated by positioning a first pointing spot of the multiple-pointing-spot cursor and clicking the mouse button. In response to the clicking of the mouse button following the movement of the cursor, the move operation is performed wherein an object at the original position is erased in response to the clicking of the mouse button following the movement of a cursor, and a designated object appears at the current position of the cursor. A copying operation may also be designated to an object by positioning a second pointing spot of a multiple-pointing-spot cursor and clicking the mouse button. In response to the clicking of the mouse button following the movement of the cursor, the copying operation is performed wherein a designated object appears at the current position of the cursor.

Furthermore, the data processing system may dynamically change the shape of a multiple-pointing-spot cursor, or change the number of pointing spots, depending on different applications and necessary operation.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
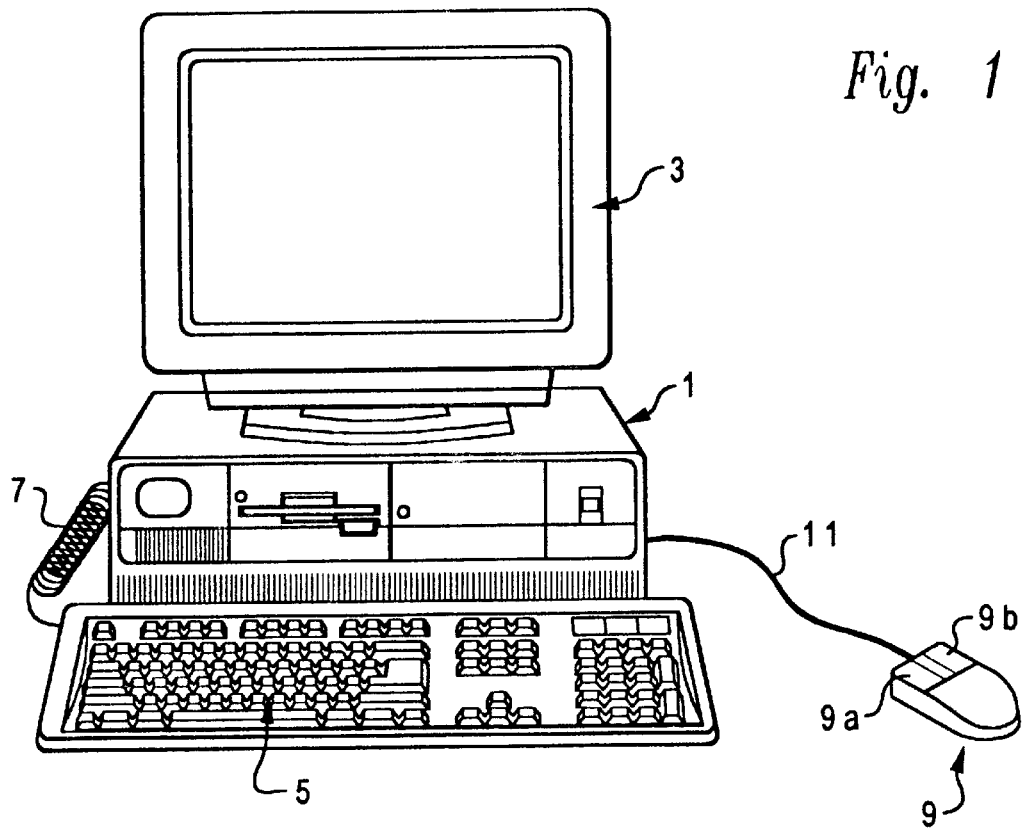
FIG. 1 illustrates a data processing for implementing the present invention.

An embodiment of the present invention will be detailed hereinbelow by referring to the drawings.

FIG. 1 is a view showing an external appearance of a hardware construction which runs a data processing system in accordance with the method and system of the present invention. The system shown in FIG. 1 comprises a system device 1 incorporating a CPU, a RAM, a hard disk drive, a floppy disk drive, a graphic display device 3 coupled to the system device 1 having an APA (all point addressable) video buffer, a keyboard 5 coupled to the system device 1 via a cable 7, and a mouse 9 coupled to the system device 1 via a cable 11. The mouse 9 is provided with a left button 9a and a right button 9b which are pressure-operated. Depending upon the application program using mouse 9, the left button 9a is usually used to select and actuate an object by clicking or double clicking, whereas the right button 9b is used for erasure.

The system device 1 shown in FIG. 1 operates under a voluntary operating system with functions for setting mouse-cursor-position acquisition and mouse cursor configuration, such as, for example, OS/2 (a registered trademark of IBM), PC-DOS (a registered trademark of IBM), MS-DOS (a registered trademark of Microsoft Corporation), WINDOWS (a registered trademark of Microsoft Corporation), X-WINDOW System (a registered trademark of MIT), a window system that is actualized under AIX (a registered trademark of IBM) and UNIX (a registered trademark of UNIX System Laboratories), or System 7 (a registered trademark of Apple Computer, Inc).

Figure 2:
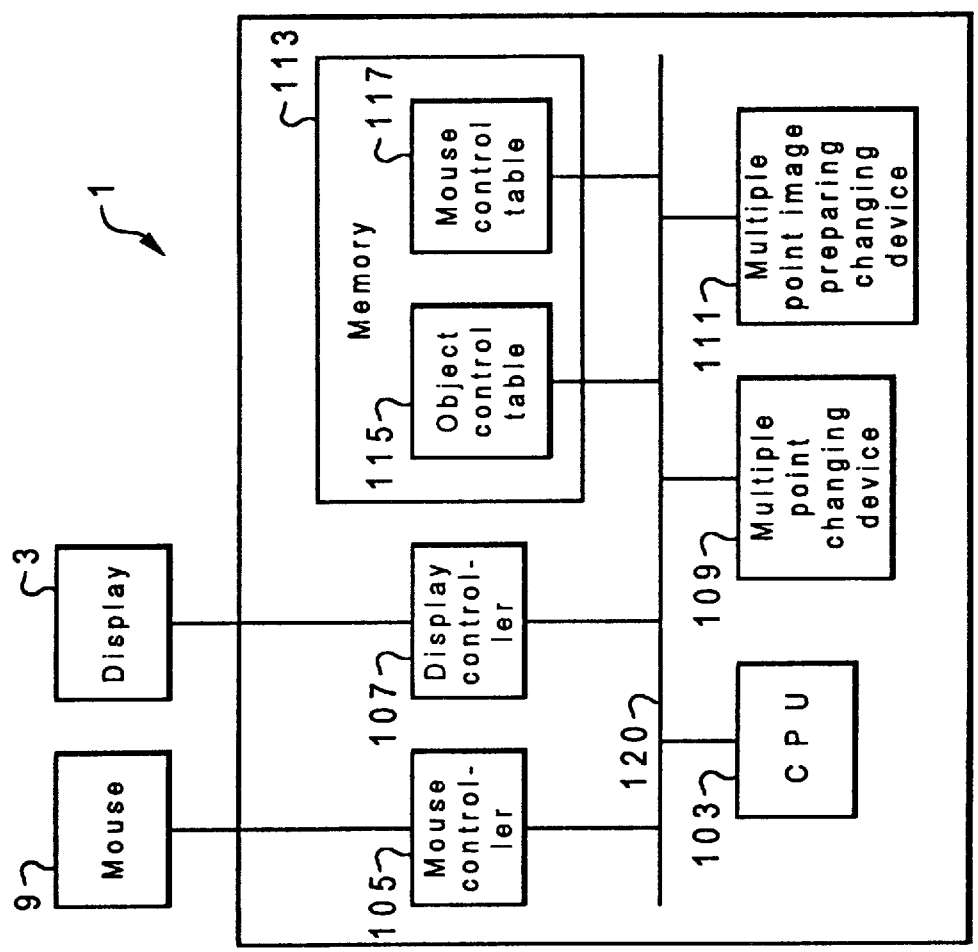
FIG. 2 is a block diagram showing a data processing system construction according to the method and system of the present invention.

FIG. 2 is a block diagram showing a construction for realizing the system of the present invention. Referring to FIG. 2, there is provided in the system device 1 a bus 120 for exchanging data. A known processor (CPU) 103 for controlling calculation, memory, input, and output is connected to the bus 120. The mouse 9, also shown in FIG. 1, is connected to a bus 120 via a mouse controller 105 which detects the revolution of a roller (not shown in the drawings) provided on the bottom of the mouse 9, and the pressing of buttons 9a and 9b (FIG. 1), and then transmits a detection signal to the CPU 103 via the bus 120.

The display 3, also shown in FIG. 1, is connected to the bus 120 via a display controller 107. Since the construction is known, the detail thereof is not shown. The display controller 107 is provided with an APA video buffer, a color palette register, and a DAC. The CPU 103 decodes a command in a program to read and write a video buffer value and set a value in the color palette register, thereby controlling graphic description on the display 3.

The memory 113 is, for example, a random access memory (RAM), which is a region where the above-described operating system is loaded when the power source of the system device 1 is turned on. It is also a region where the control of an operator or the control of the CPU 103 loads an application program from a hard disk drive (not shown in the drawings), floppy disk drive (not shown in the drawings), or CD-ROM drive (not shown in the drawings).

Within memory 113, an object control table 115 and a mouse information control table 117 are prepared and maintained by the application program in which the mouse is used.

The multiple-point changing device 109 and the multiple-point image preparing/changing device 111 are depicted as a block different from the memory 113. Each of these devices is preferably an application program loaded in memory 113.

The outline of the operation of the system in FIG. 2 is shown below. When the power source of the data processing system is turned on, the operating system is read from a hard disk to the memory 113. With such an operation, the CPU 103 follows the control of the operating system, thereby controlling the display controller 107 for displaying on the display 3, for example, the initial screen of the multi-channel window.

Subsequently the operator may apply a mouse cursor on a predetermined icon on the screen and actuate an application program using a multiple-point mouse function of the present invention by double clicking a right button 9a of the mouse 9. The program may then open one new window to display a predetermined menu, and prepare an object control table 115 and a mouse information control table 117 in the memory 113. The CPU 103 follows the content of the mouse information control table 117 to display the multiple-pointing-spot cursor on the window.

When the operator moves the mouse 9 on the table, a ball (not shown in the drawings) provided on the bottom of the mouse 9 rotates. A mouse controller 105 detects this rotation of the ball, and the detection signal is sent to the CPU 103 through the bus 120. The CPU 103 then changes the display position of the multiple-pointing-spot cursor on the display 3 via the display controller 107 (in actuality, the image of the mouse cursor is erased once and depicted again).

Then, when the operator presses down, or clicks, the right button 9a of the mouse 9, the mouse controller 105 detects the press-down operation and transmits to the CPU 103 a signal notifying the detection thereof. The CPU 103 then refers to the object control table 115 in the memory 113 and identifies an object at which the mouse cursor is positioned. At the same time, the CPU 103 refers to the mouse information control table 117 and determines whether or not any of the multiple pointing spots out of the currently used multiple-pointing-spot cursor is positioned on the object, and if so, performs a predetermined operation in response to the pointing spot identified.

The multiple-point changing device 109 is provided with a function for changing the number and arrangement of multiple pointing spots in the multiple-pointing-spot cursor in response to a command from the CPU 103.

The multiple-point changing device 111 functions as a normal bit map graphic editor, but it also has an additional function for designating multiple pointing spots.

Next, the specific structure and logic for realizing a multiple-pointing-spot cursor will be explained.

Object Control Table

In the present invention, there are graphic display elements, such as lines, squares, circles, letters, and icons. For example, when an "Application 1" displayed in the window 3 is considered as a reference on a screen of the display 3 shown in FIG. 3, a triangle G1, a circle G2, and lines G3 and G4 are individual objects. When the operating system serves as a reference, windows 3a and 3b, and icons 3d, 3e, 3f, and 3g are individual objects.

Figure 4:
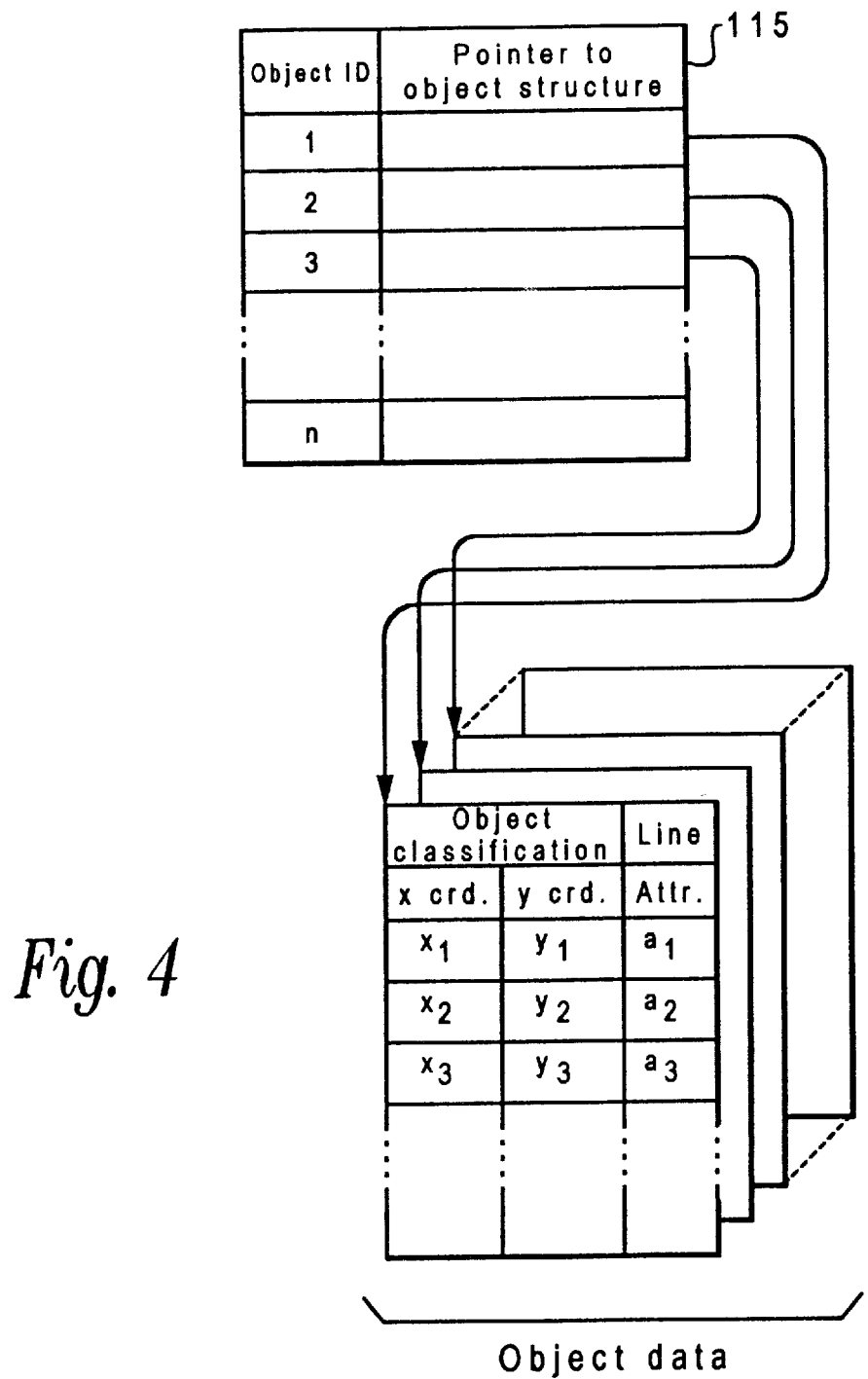
FIG. 4 illustrates an object table.

Referring to FIG. 4, an example of an object control table 115 is shown. The entries in object control table 115 include an "object ID" and substantial data associated with the object ID. The kinds of objects are diverse. Since it is difficult to prepare a fixed entry field, the object control table 115 stores nothing but a pointer for object construction. Individual object construction data stores kinds of objects (circles, lines, squares, and letters), one or more sets of X, Y coordinate data, and attributes data such as color or the like. Their contents are dynamically changed by the operating system and the application program. In addition, the object control table 115 itself is changed by the operating system and the application program so as to dynamically add or delete the object entry.

Figure 3:
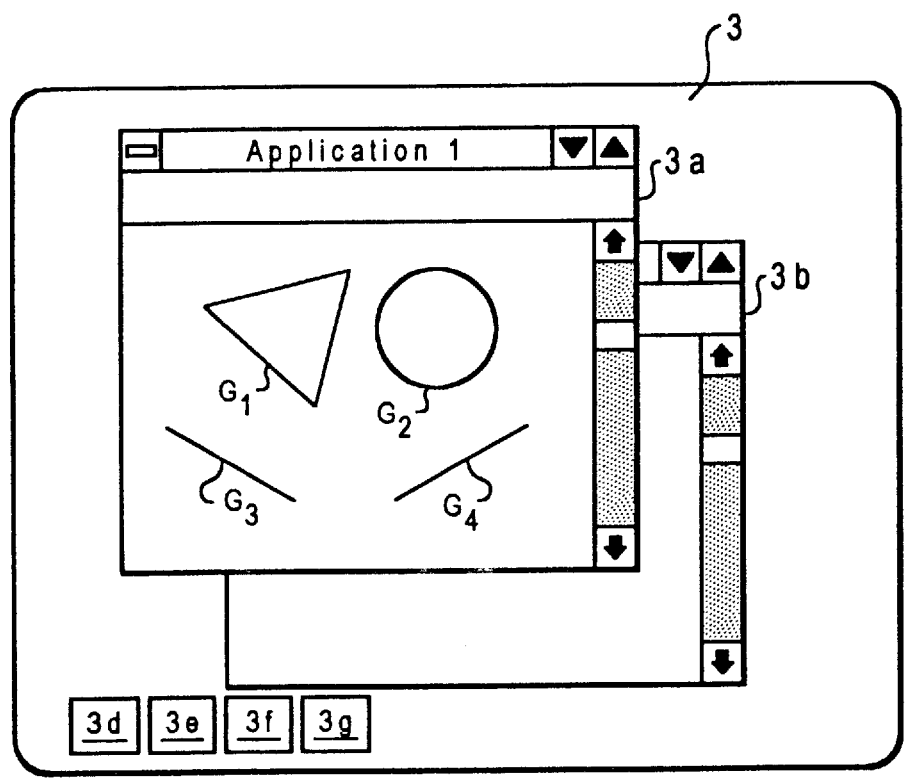
FIG. 3 depicts an example of objects displayed on a screen.

In an example shown in FIG. 3, the object control table for windows 3a and 3b, and icons 3d, 3e, 3f, and 3g is globally controlled by the operating system, whereas the object control table for objects G1 through G4 is locally controlled by "Application 1". Referring to FIG. 3, the object ID is designated with a serial number beginning from one (1). This is merely an example and it may be anything as long as it identifies an object in some sense. It is not restricted to such a value.

Multiple-Pointing-Spot Mouse Cursor

Figure 5:
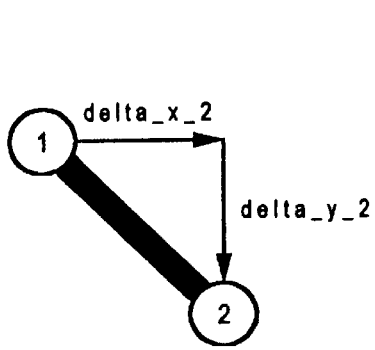
FIG. 5 depicts an example of a multiple-pointing-spot cursor.

An example of a multiple-pointing-spot cursor (also referred to as a multiple-point mouse cursor) is shown in FIGS. 5 through 9. FIG. 5 shows an example of a double-point mouse cursor. As shown in FIG. 5, the multiple-point mouse cursor typically consists of one reference point (pointing spot "1" in the case shown in FIG. 5) which itself is a pointing spot, and the offset X component and Y component of different pointing spots relative to the reference point. FIG. 5 shows offset X component and Y component as delta_x_2, and delta_y_2, respectively.

Figure 6:
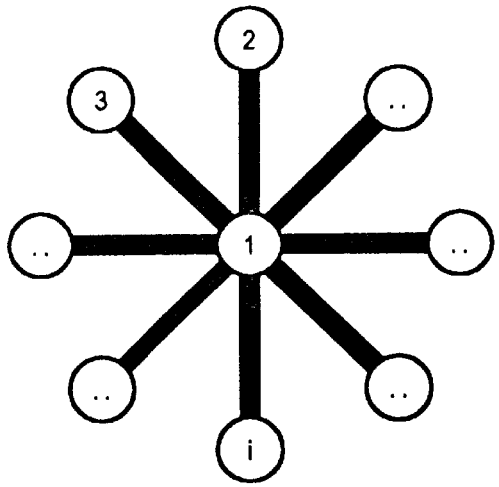
FIG. 6 illustrates another example of a multiple-pointing-spot cursor.

FIG. 6 shows an example of a mouse cursor having a larger number of pointing spots. In this example, pointing spot "1" shown in FIG. 6 serves as a reference point, and the offset to the i-th pointing spot is given as delta_x_i and delta_y_i (i=1 through n, where n represents the number of pointing spots).

Here, the acquisition function of the coordinate position is incorporated in a voluntary operating system supporting a mouse cursor function. For example, MS-DOS and PC-DOS stores a value, such as 03H, in an AX register. When the software of INT33H is interrupted, the X coordinate is stored in a CX register and the Y coordinate in a DX register. In addition, an API function called MouGetPtrPos is used in OS/2. The X coordinate is acquired in an element named row of the structure of _PTRLCOL, and the Y coordinate is acquired in an element called col. Addition of offset to the i-th pointing spot to the coordinate values thus acquired determines the current coordinate values Xi and Yi of the i-th pointing spot.

In addition, in these examples, the reference point itself is given as the pointing spot, but the reference point itself may not be the pointing spot. When the reference point is given as the pointing spot, the formula of delta_x_1=0, delta_y_1=0 is established. When the reference point is not given as the pointing spot, the formula of delta_x_1≠0, delta_y_1≠0 is established.

Figure 7A:
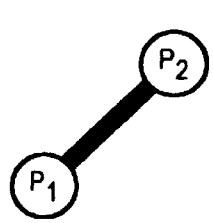
FIGS. 7a, 7b, and 7c depict other examples of multiple-pointing-spot cursors.
Figure 7B:
Figure 7C:
Figure 8:
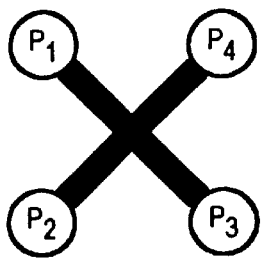
FIG. 8 illustrates another example of a multiple-pointing-spot cursor.

FIGS. 7a, 7b, and 7c show various states of a double-point mouse cursor. In addition, FIG. 8 shows an example of a quadruple-point mouse cursor.

Figure 9:
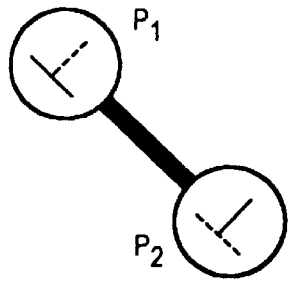
FIG. 9 depicts another example of a multiple-pointing-spot cursor.

FIG. 9 shows an example of a double-point mouse cursor, where the difference between the example in FIG. 9 and the counterpart shown in FIGS. 7a, 7b, and 7c is that the figure associated with the operation is represented with a bit map. This double-point mouse cursor may be used for drawing a line vertically dividing another line, which is not shown in this figure. Consequently, at the position of P1, it is shown in the figure that the horizontal portion of the vertical bisector is designated. At the position of P2, it is shown in the figure that the vertical portion of the vertical bisector is designated.

Figure 10:
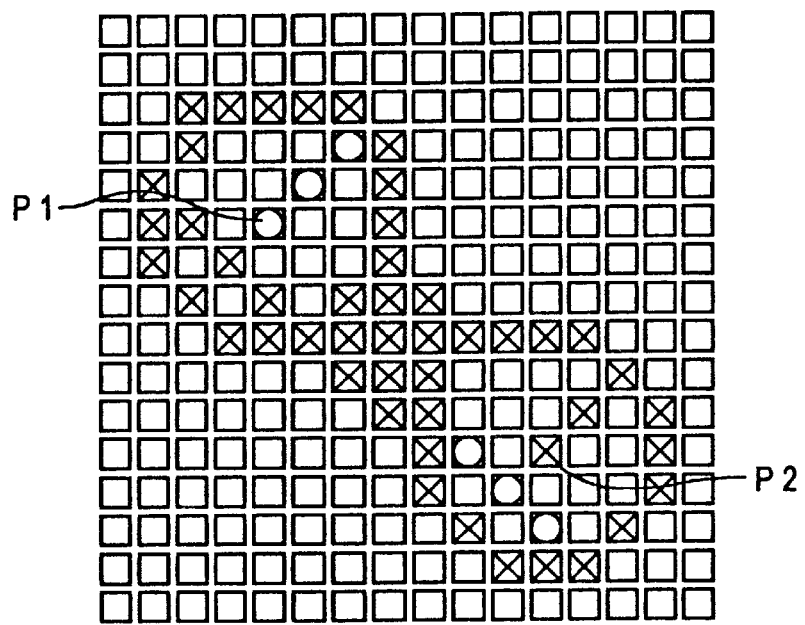
FIG. 10 illustrates a bit map and pointing-spot in a multiple-pointing-spot cursor.

FIG. 10 shows a bit map of the double-point mouse cursor in FIG. 9. Referring to FIG. 10, Symbol "X" designates a black pixel and Symbol "O" designates a red pixel. Such a bit map is formed by the multiple-point image preparing device 111 in FIG. 2. In this sense, the multiple-point image preparing device 111 has the function of a normal bit map editor. The multiple-point image preparing device 111 has the functions of designating reference position of the multiple-point mouse cursor, the number of the multiple-pointing spots, and the position of the multiple-pointing spots. In the actual operation of the multiple-point image preparing apparatus 111, the operator designates the reference points after the cursor bit map has been prepared. In an embodiment where the reference point itself serves as the pointing spot, the number of the multiple pointing spots is one (1).

Then, in FIG. 10, P1 is selected as a reference point or the pointing spot. When the editing is terminated at this stage, a mouse cursor is produced having only one conventional pointing spot. When a different pointing spot (for example P2 shown in FIG. 10) is selected by continuing the editing, the offset of the different pointing spot is selected by continuing the editing, and the offset of the X coordinate and the Y coordinate from the reference point P1 up to point P2 is passed to the predetermined buffer region. Then the number of the multiple pointing spots increases to two (2). When editing is completed, data—such as the number of pointing spots, the reference position of individual pointing spots and cursor bit map—are mutually associated and stored on a disk.

Mouse Information Control Table

Figure 11:
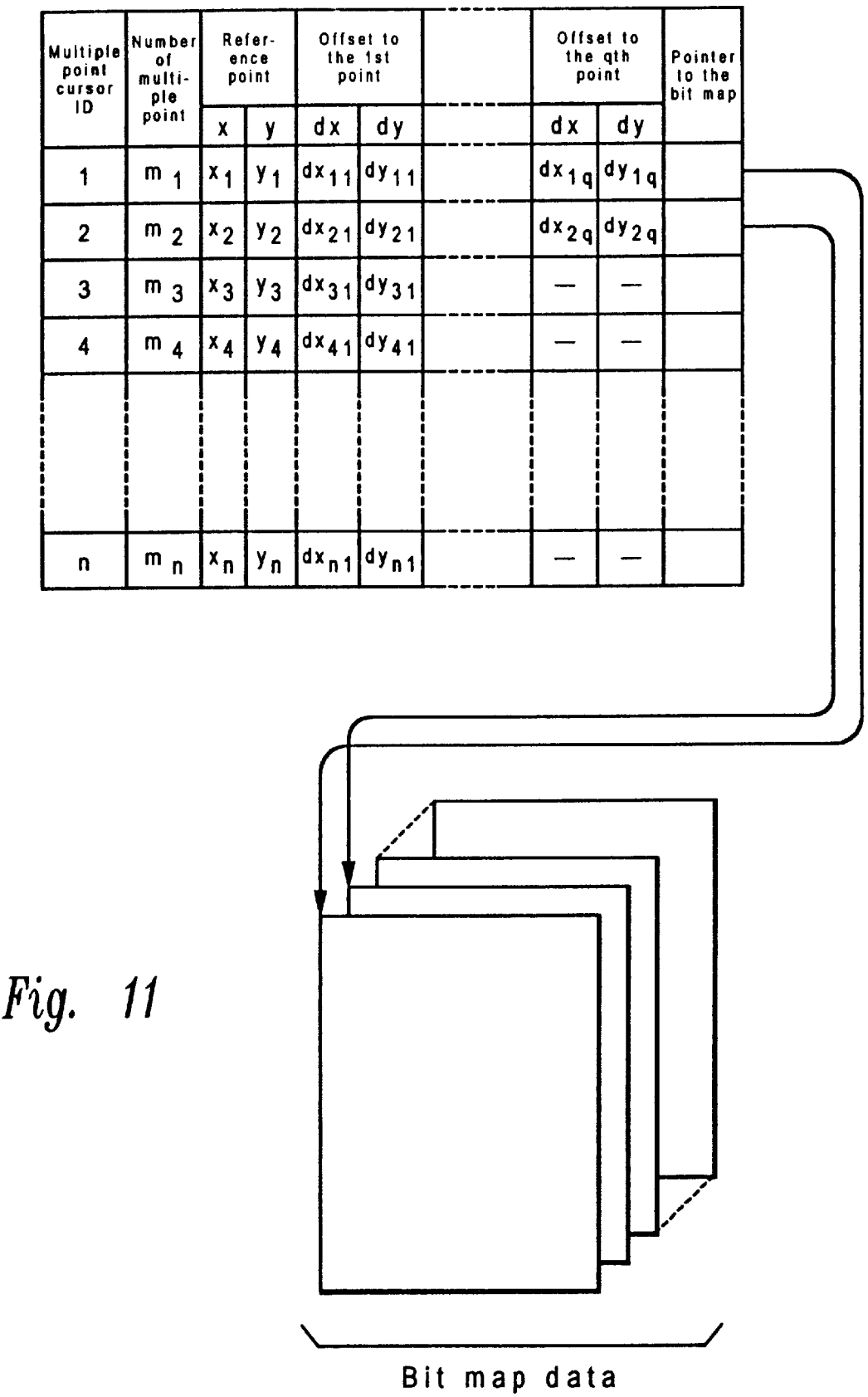
FIG. 11 depicts an example of a mouse information control table.

FIG. 11 shows a mouse information control table. The mouse information control table is controlled by the operating system or the application program. With respect to each unit of mouse cursor information, there is held the cursor ID, the number of multiple pointing spots, the coordinate position of the reference points in the bit map, offset values $dx_{ij}$, $dy_{ij}$ of X and Y coordinates from the reference points of the first to q-th multiple pointing spots, and the pointer to the cursor bit map data. That is to say, when the number of multiple pointing spots assumes a value r which is smaller than q, the offset value described in the field ranging from r+1 to q designates "don't care". In FIG. 11, it is represented by "–". When a pair of offset X and Y values of a series of pointing spots is link listed to arrange the NULL pointer in the anchor, there is no need to specifically record the number of pointing spots or prepare the field for the offset of the q set.

Such a mouse information control table is preferably prepared in the memory 113 (shown in FIG. 2) at system start-up by reading predetermined information from the disk utilizing the operating system. However, the mouse information control table works so that a specific application using a multiple-point mouse cursor is constituted in a local memory region belonging to the application at the time of application startup.

In a specific window or application, a double-point changing device 109 (shown in FIG. 2), which serves as one program loaded in the memory 113, designates which of the cursors is used in accordance with the operation by the operator or a command from the operating system or change the designation thereof. Furthermore, the double-point changing device 109, in accordance with the operation by the operator or a command from the operating system, reads a new record of a mouse cursor from a disk to add to the mouse information control table, or deletes an unnecessary record of the mouse cursor from the mouse information control table. Incidentally, referring to FIG. 11, the multiple-point mouse cursor ID is represented in a serial number beginning from one (1). This is merely an example, and it may individually designate a record for describing data of individual multiple-point cursor in one sense. Cursor ID's are not limited to the above value.

Furthermore, the AX=09H in INT33H of MS-DOS has a function for setting the shape of the cursor. It is possible to designate the reference position where the (BX, CX) point in the bit map of the cursor shape data is obtained with a hot spot, or INT33H, AX=03H if BX=cursor hot spot X position, CX=BX=cursor hot spot Y position are designated and an address where the cursor shape data exists is designated to ES:DX in advance. In OS/2, there exists an API called MouSetPtrShape, which has the same function. Consequently, the multiple-point changing device 109 called such functions with reference points x, y shown in FIG. 11 and sets the multiple-point mouse cursor.

Control for Multiple-Pointing-Spot Mouse Cursor

Control operation for the multiple-point mouse cursor will be detailed hereinbelow in conjunction with FIGS. 12 and 13. This control operation routine is called by an application program using the multiple-point mouse cursor of the present invention when required. Thus it is possible to realize the routine as a standard API.

Figure 12:
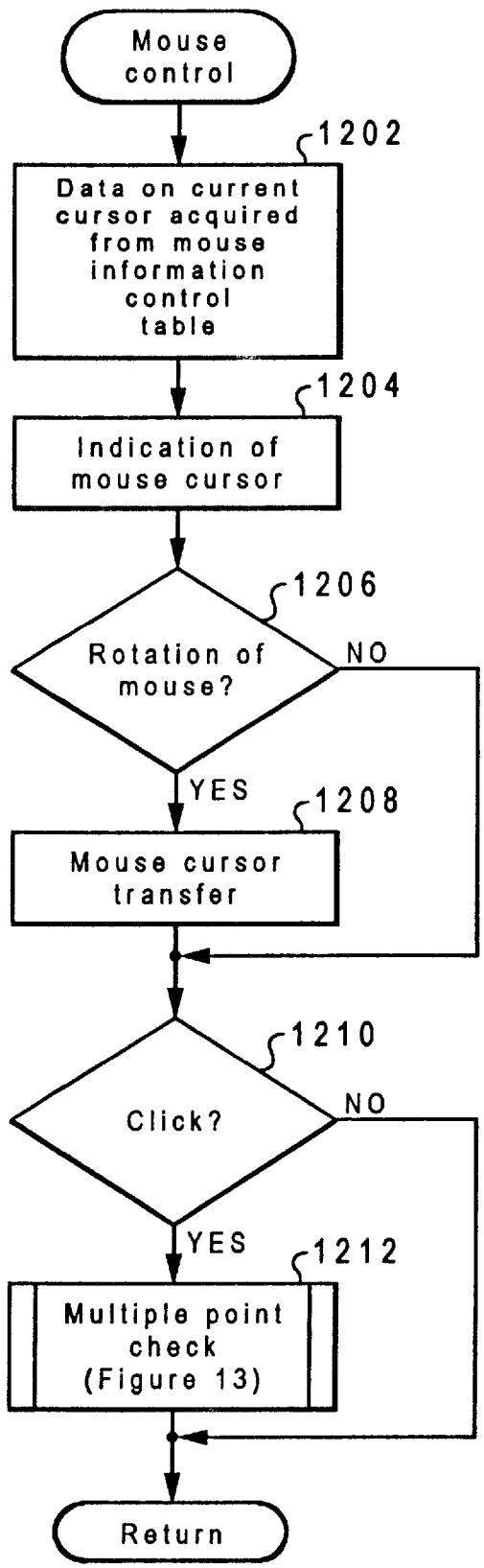
FIG. 12 is a flowchart which illustrates the control operation of a multiple-pointing-spot cursor.
Figure 13:
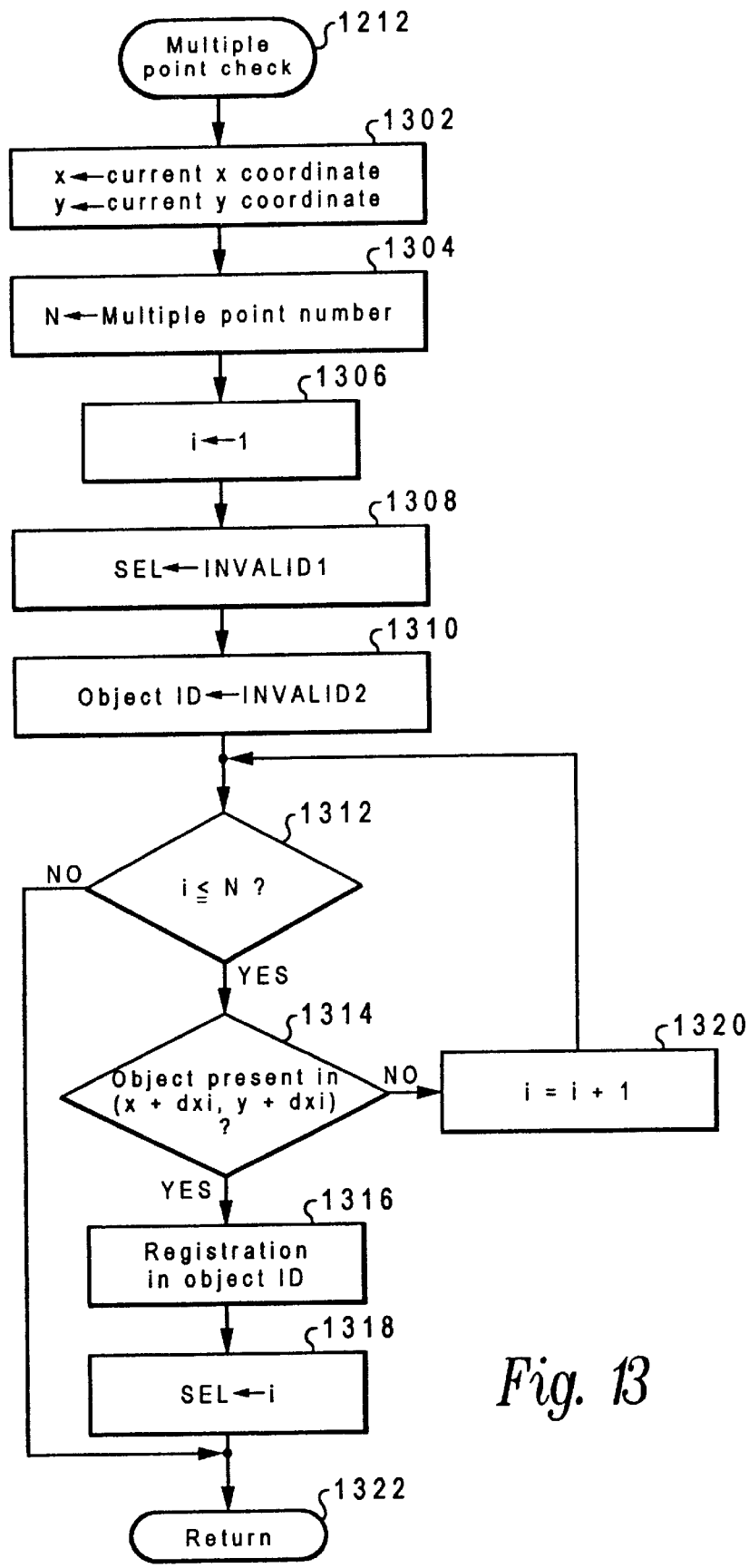
FIG. 13 is a flowchart which illustrates the control operation of a multiple-pointing-spot cursor.

At step 1202 shown in FIG. 12, information on the currently used multiple-point mouse cursor—such as the number of multiple pointing spots including positional information on the offset of such pointing spots—is acquired from the mouse information control table 117. This operation is actually performed through the multiple-point changing device 109. That is because the multiple point changing device 109 incorporates information on which mouse cursor is currently in use.

At step 1204, the bit map of the mouse cursor is displayed at the current cursor position based on information acquired from the mouse information operation table 117. At steps 1206 and 1208, the mouse cursor moves (i.e., is transferred) on a screen with the rotation of a mouse ball (not shown in the drawings). INT33H and AX=0BH are used in the mouse cursor movement on MS-DOS. This enables the acquisition in CX and DX from the previous read-out a distance in which the mouse cursor has moved either in the vertical or horizontal directions. Then the position of the mouse cursor can be set by setting in CX and DX desired coordinate positions so as to use INT33H and AX=04H. In OS/2, the position of the mouse cursor can be set with API such as MouGetPtrPos and MouSetPtrPos.

At step 1210, the presence of the clicking of the left button (refer to 9a in FIG. 1) of the mouse is checked. When the absence of clicking is detected, other application operation is performed. Thus the operation returns from the mouse control function. In MS-DOS, the clicking of the mouse can be detected with INT33H and AX=05H. In OS/2, the clicking of the mouse can be detected with API such as MouGetEventMask. Incidentally, the rotation of the mouse ball and the clicking of the mouse can be individually detected at steps 1206 and 1208 in FIG. 12. API such as MS-DOS, Windows and OS/2 can simultaneously detect the mouse ball rotation and the clicking thereof. They can thus be substituted with a single judgment step at step 1206 and 1208.

Moreover, with respect to FIG. 12, except for step 1202, the above control function can be realized within the established scope as detailed by citing the function of MS-DOS and OS/2. At step 1210 performed when the event of the click is realized, the operation is peculiar to the present invention.

Then, referring to a flowchart shown in FIG. 13, the content of step 1212 will be explained in more detail. At the outset, at step 1302, the current X coordinate and Y coordinate values for the reference point of the mouse cursor is acquired and then prepared as values, x and y, respectively.

At step 1304, the number of multiple pointing spots is prepared as value N. At step 1306, a variable i for the index is initialized to 1. At step 1308, SEL—which is a variable showing at which point operation—is selected and is initialized to such values as –1 and 999 (hereinafter referred to as INVALID 1) which are not used as a number of the multiple pointing spots. At step 1310, a variable named an object ID stores such values as –1 and 999, which are not used as an actual object (hereinafter referred to as INVALID 2).

At step 1312, a determination is made as to whether or not i is less than N. When i is less than N, it is determined whether or not an object is present at a coordinate point of $(x+dx_i, y+dy_j)$. At the initial step, a value i=1 is given, which is a determination as to which object the first pointing spot of the mouse cursor designates. Here, Symbols $dx_i$ and $dy_i$ designate the offset of the X coordinate and the Y coordinate from a reference point of the i-th point in the currently used multiple-point mouse cursor obtained at step 1202 in FIG.

12. It is determined whether or not an object is present in the coordinate by referring to the coordinate position of each object in the object control table shown in FIG. 4.

At step 1314, when it is determined an object is present at coordinate $(x+dx_i, y+dy_i)$, the object ID of the object is stored and i is stored in SEL, followed by returning to the flowchart shown in FIG. 12. The program shown in FIG. 12 serves to bring back the object ID and SEL to some application program when the program shown in FIG. 12.

After returning to FIG. 13, and if it is determined that no object is present at coordinate $(x+dx_i, y+dy_i)$, as illustrated at step 1314, i is increased by 1 at step 1320. Thereafter the control returns to step 1312 to determine again whether or not i is less than or equal to N. When i is less than or equal to N, the process proceeds to the above-described step 1314 and onward.

On the other hand, when the determination at step 1312 is negative, this means that no object was found in any pointing spot i=1 through N. In such a case, the control returns to step the flowchart shown in FIG. 12 with INVALID stored in the object ID.

Figure 14:
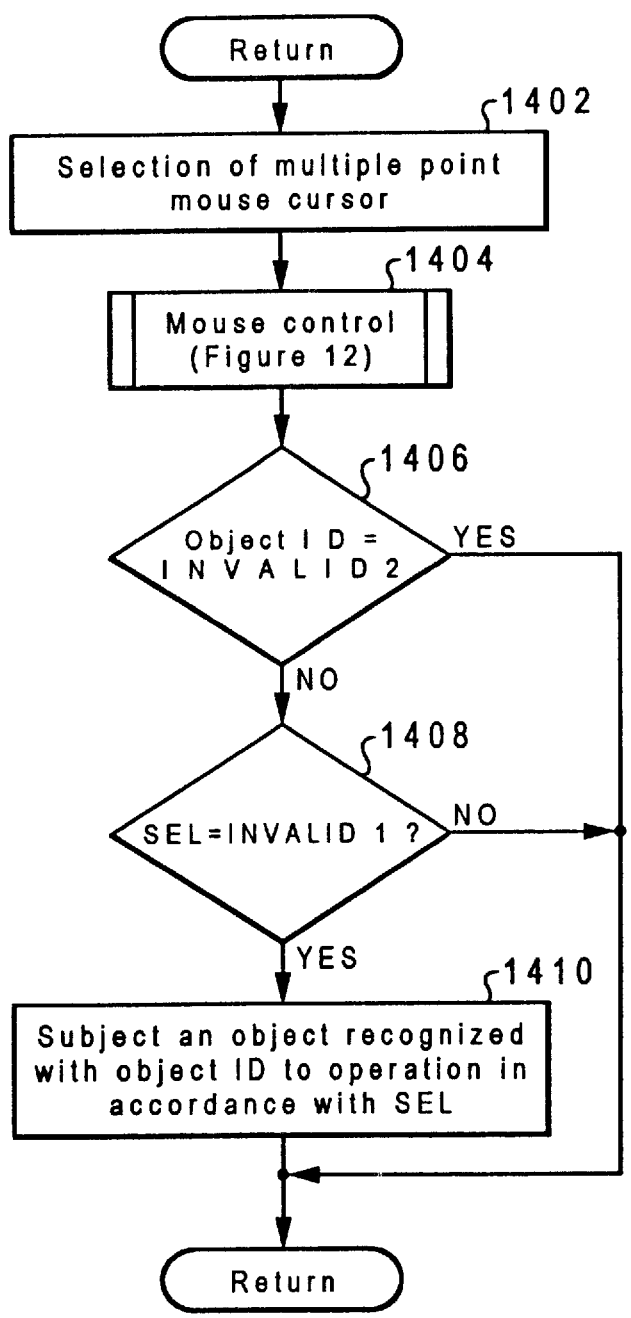
FIG. 14 is a flowchart of an application program using an operation that is depicted in FIGS. 12 and 13.

FIG. 14 is a view showing an example of a typical application program employing a mouse control routine shown in FIG. 12. At step 1402, the application program uses the multiple-point mouse changing device 109 to select and set an appropriate multiple-pointing-spot mouse cursor from a mouse information control table 117.

At step 1404, when it is assumed that the system is represented in C, the application program calls a program and routine shown in the flowchart shown in FIG. 12 with an address of a structure including, as elements thereof, the object ID and selection number SEL. The routine shown in FIG. 12 then performs the movement of the mouse cursor and detects the mouse click event. At step 1406, it is determined whether or not an object ID value sent back from the routine shown in FIG. 12 is INVALID 2. As is apparent from FIGS. 12 and 13, the fact that an object ID value is INVALID 2 means that either no mouse click event is generated (refer to step 1210 in FIG. 12) or no object is present at any position of the multiple pointing spots of the mouse cursor (refer to steps 1310 and 1314 in FIG. 13). In such a case, the application program does not do anything.

However, when the object ID value sent back from the routine shown in FIG. 12 is not INVALID 1 (i.e., when the mouse is being clicked), it is determined at step 1406 which of the multiple pointing spots of the mouse cursor designates which of the objects. When such determination is made, the control proceeds to the determination of the SEL value sent back from the routine shown in FIG. 12 (step 1408). As mentioned above, the SEL value is the number of the pointing spot designating the object. When the SEL value is an appropriate number, an operation is performed in accordance with the SEL value at step 1410. Incidentally, steps 1408 and 1410 are described as follows when a C like pseudo code is used.

```
switch (SEL)    {
case 1:         operation 1;
                break;
case 2:         operation 2;
                break;
case 3:         operation 3;
                break;
..........
..........
case N:         operation N;
                break;
``` default:        exceptional operation;
                break;
}

Operations 1 through N as well as exceptional operations are to be preliminarily designated by the person who prepares the application. Incidentally the application program does not call the routine shown in FIG. 12. As described later with reference to FIG. 15, the mouse information control table 115 may be directly accessed through the multiple-pointing spot changing device 109 to acquire and process offset information for multiple pointing spots.

Application Examples

The multiple-point mouse cursor of the present invention may be used in various interactive operations. Although some application examples of the multiple-point mouse cursor of the present invention will be shown hereinbelow, it is to be understood that the scope of this application is not limited to these examples.

1. Designation of Vertical Bisector of Line

A certain kind of education program effects an operation for positioning one of two lines as a vertical bisector relative to the other. However, with conventional mouse cursors, it is difficult to designate which should be a bisector line and which should be a line to be divided by the bisector. For example, it may be possible to designate a first line to be divided by clicking the line, and then clicking a second line designated to be the bisector. However, some positional relationships between the two lines disturb orderly relations, thereby confusing users to a considerable degree in operation.

Figure 15:
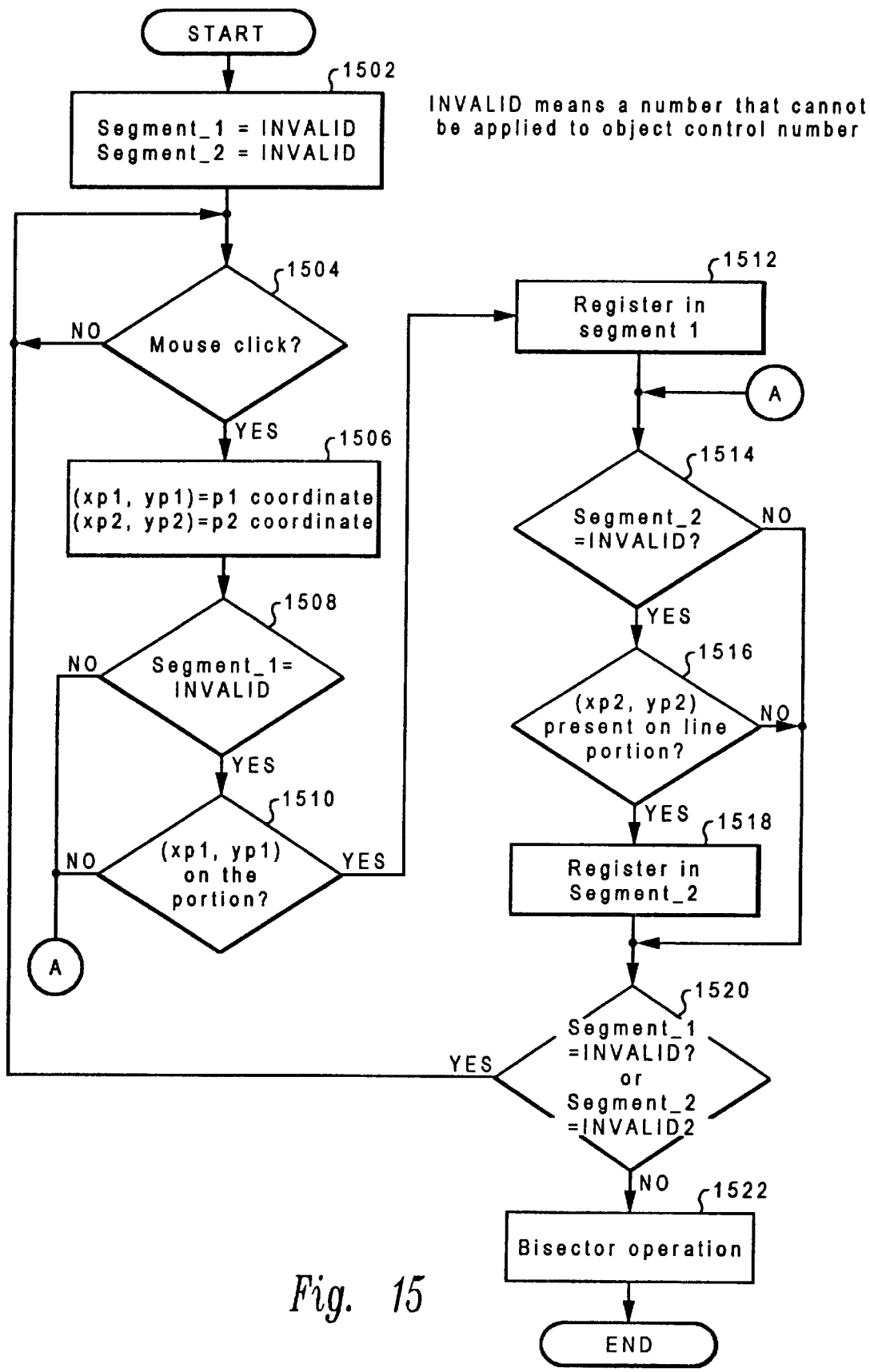
FIG. 15 is a flowchart for a vertical bisector operation using a multiple-pointing-spot cursor.

The operation shown in FIG. 15 solves this problem. At the outset, it is to be assumed that two-point cursor shown in FIG. 9 is designated. At step 1502, variables such as Segment__1 and Segment__2 store a value such as INVALID. The meaning of INVALID is the same as that mentioned with respect to step 1310 shown in FIG. 13. At step 1504, the mouse click is checked so that when the mouse click is detected, the coordinate positions of $P_1$ and $P_2$ shown in FIG. 9 are stored as (xp1, yp1) and (xp2, yp2).

In more detail, the operation is effected in the following way. When (xp1, yp1) is set as the reference point, these values can be immediately acquired with the aforementioned software interruption or API calling. In addition, the mouse information control table stores offset X coordinate and Y coordinate values from $P_1$ to $P_2$. Consequently, addition of the offset values to the reference value allows immediate calculation of $P_2$ coordinate value.

At step 1508, it is determined whether or not segment__1 is INVALID. If Segment__1 is INVALID, it means that no line portion is registered. Thus, at step 1510, it is determined whether or not the coordinate (xp1, yp1) is located on the line portion (the line portion is considered as an object here only). If the coordinate is located on the line portion, the line portion is registered in Segment—1 at step 1512.

In the same way, step 1514 determines whether or not Segment__2 is INVALID. If Segment__2 is INVALID, it means that Segment__2 registers no line portion. Thus step 1516 determines whether or not (xp2, yp2) is located on a line portion (the line portion is considered as an object here only). If (xp2, yp2) is located on the line portion, Segment__2 registers the line portion at step 1518.

Step 1520 is to check whether or not either Segment__1 or Segment__2 is still INVALID. If either Segment__1 or Segment_2 is INVALID, the control returns to the determination at step 1504.

The fact that neither Segment_1 nor Segment_2 is INVALID means that both Segment_1 and Segment_2 register an appropriate object ID for an appropriate line portion. Thus at step 1522, combinations of line portions are treated by regarding Segment_1 as a line vertically divided with a bisector and Segment_2 as a bisector vertically dividing the former line portion.

Figure 16A:
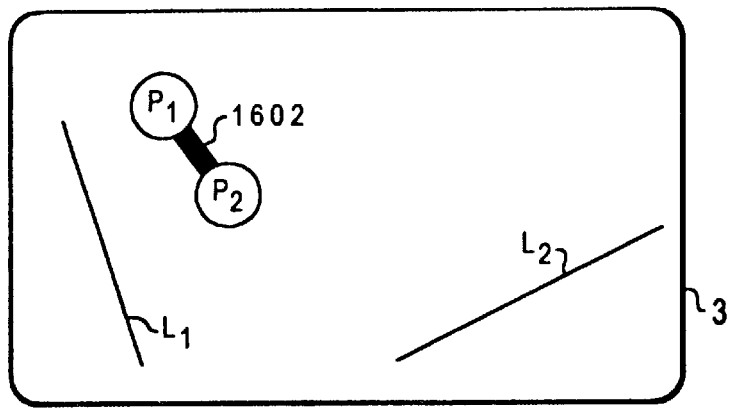
FIGS. 16a, 16b, 16c, and 16d depict steps of a vertical bisector operation using a multiple-pointing-spot cursor.

Next, referring to FIGS. 16a, 16b, 16c, and 16d, the action of the flowchart shown in FIG. 15 will be detailed. FIG. 16a shows line portions $L_1$ and $L_2$ and double-point cursor 1602 on the screen.

Figure 16B:
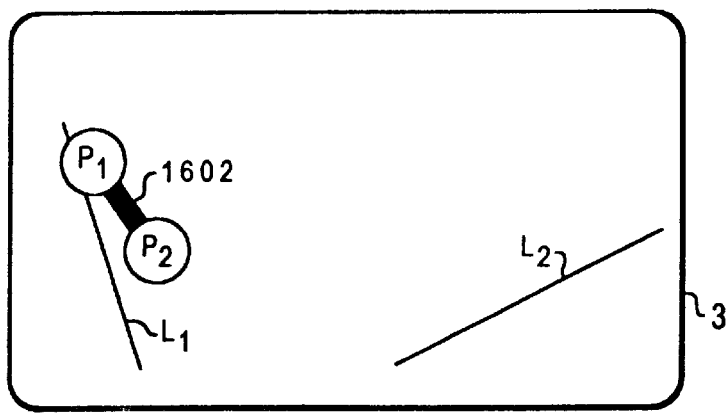

In FIG. 16b, line portion $L_1$ is clicked at pointing spot $P_1$ of the double-point cursor 1602, thereby registering line portion $L_1$ as Segment_1.

Figure 16C:
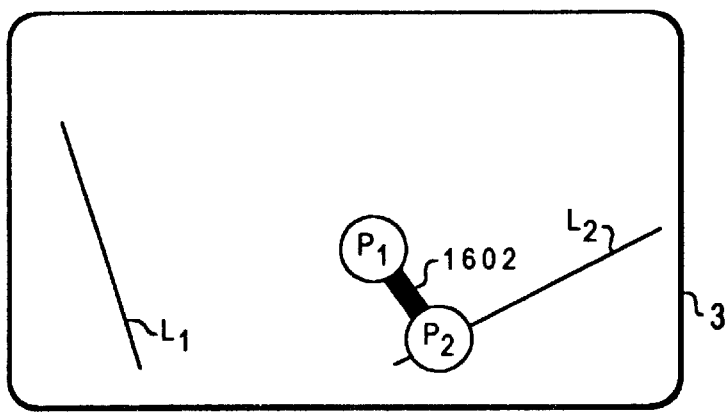

In FIG. 16c, line portion $L_2$ is clicked at point $P_2$ of the double-point cursor 1602, thereby registering line portion $L_2$ as Segment_2.

Figure 16D:
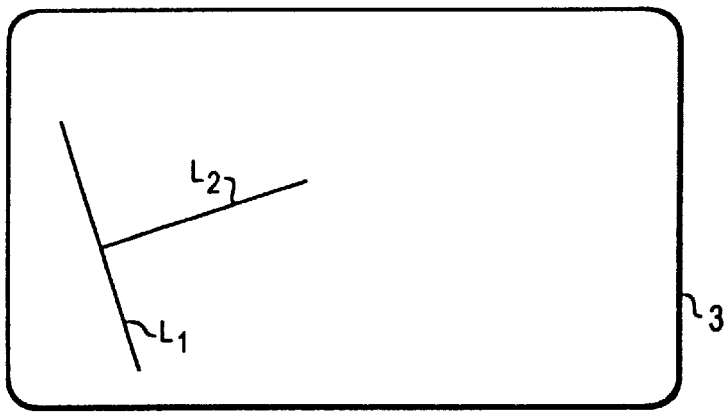

In FIG. 16c, the registration of line portion $L_1$ and line portion $L_2$ sets $L_1$ as a line vertically divided with the bisector, and $L_2$ as a bisector vertically dividing the former line, thereby combining the two line portions. At this time, $L_1$ is clicked with $P_1$, whereas $L_2$ is clicked with $P_2$. In such a case the result of the operation, which is illustrated in FIG. 16d, is unrelated to the order of the clicking. Users can thus reduce any annoyance of the operator.

2. Copy and Move an Object

Figure 17:
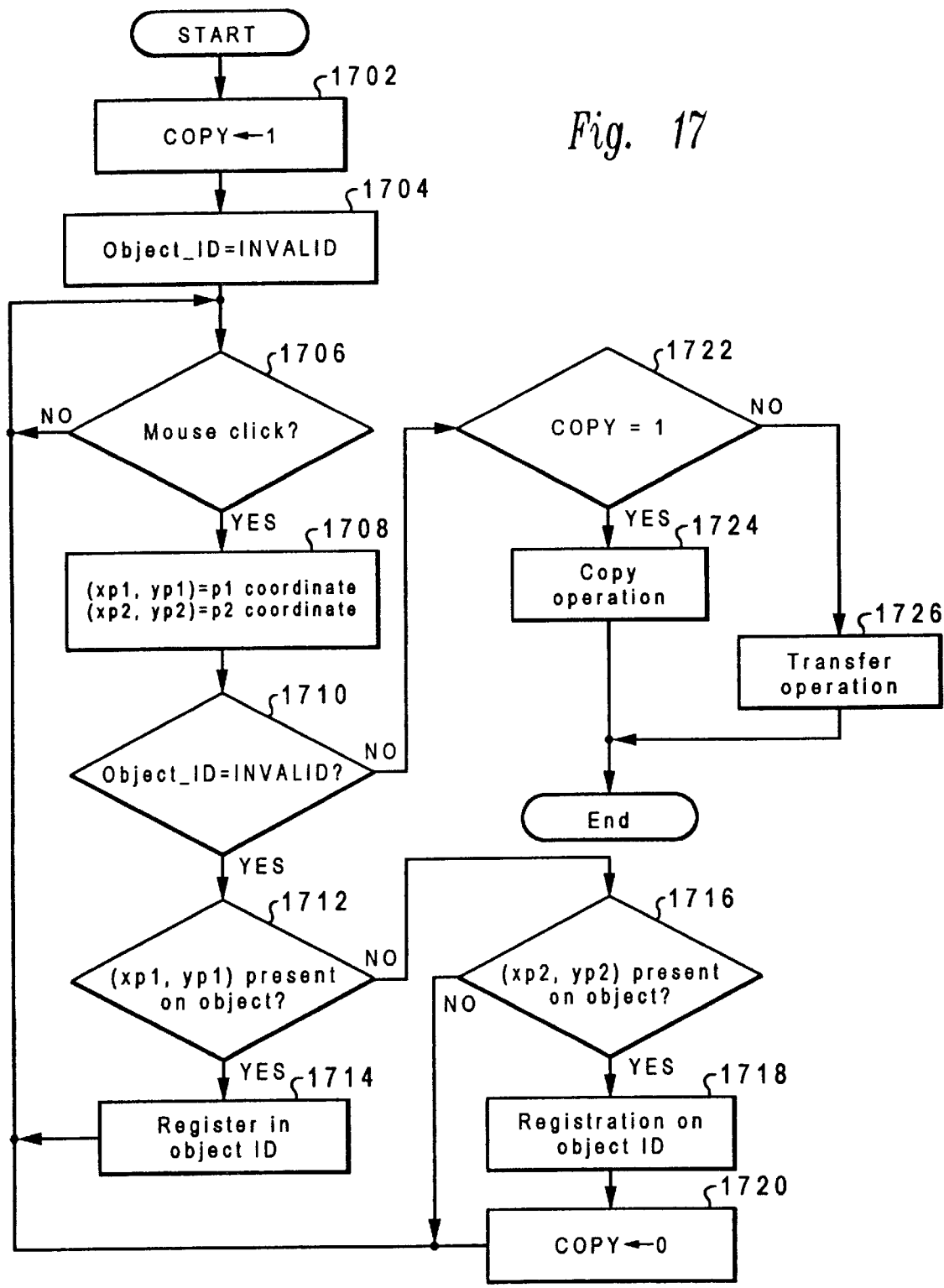
FIG. 17 is a flowchart for an object copying and move operation using a multiple-pointing-spot cursor.

Referring to the flowchart in FIG. 17, copy and move operations of objects will be detailed. In such a case, assume that a double-point cursor is set as shown in either of FIGS. 7a, 7b, and 7c or in FIG. 9. At the outset, step 1702 sets COPY flag to 1. At step 1704, a value INVALID is set to a variable Object ID. This operation is similar to step 1502 shown in FIG. 15. Step 1706 is to check for mouse clicking. When the presence of mouse clicking is detected, $P_1$ and $P_2$ coordinate positions shown in FIG. 9 are stored as (xp1, yp1) and (xp2, yp2), respectively at step 1708.

Step 1710 is to check whether or not the formula Object ID=INVALID is established. If the formula is established, a copy of object or the object to be moved are not yet selected. The process thus proceeds to step 1712 to determine whether nor not an object is present at (xp1, yp1). If an object is present at such a coordinate position, Object ID registers the ID of the object at step 1714 to return to step 1706. If an object is absent, a determination is made at step 1716 as to whether or not an object is present at (xp2, yp2). If an object is present at (xp2, yp2), Object ID registers the ID of the object at step 1718. At the same time, the COPY flag is set to 0 at step 1720 and returns to step 1706.

On the other hand, if the determination of Object ID=INVALID is negative at step 1710, the process proceeds to step 1722 to check the COPY flag value. When COPY flag=1 is established, a copy operation is performed at step 1724. If it is not established, a move operation is performed at step 1726.

Figure 18A:
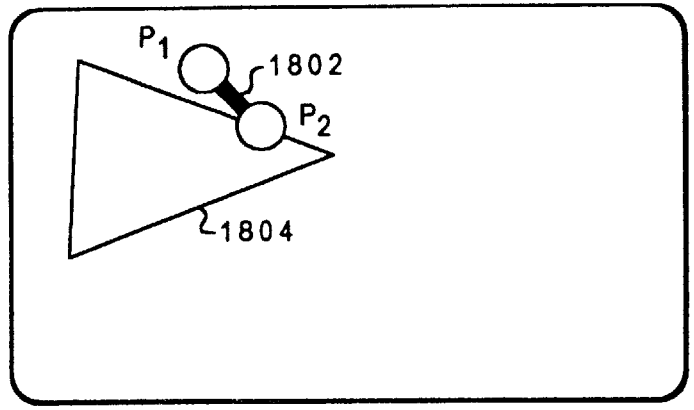
FIGS. 18a, 18b, 18c, and 18d depict steps for an object copying and move operation using a multiple-pointing-spot cursor.
Figure 18B:
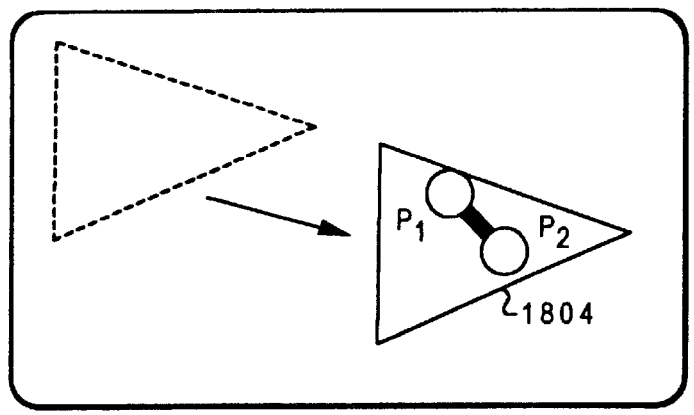

The steps of the operation is explained in conjunction with FIGS. 18a, 18b, 18c, and 18d. FIG. 18a shows two-point cursor 1802 having pointing spot $P_1$ and pointing spot $P_2$, and an object (triangular FIG. 1804). In FIG. 18a, when an object 1804 is clicked at pointing spot $P_2$, the object is registered as an object to be processed. At the same time, the clicking of the object at pointing spot $P_2$ causes COPY flag to assume 0, thereby selecting a move operation. Then, as shown in FIG. 18b, when the mouse (i.e., pointing device) is moved, the object 1804 is moved to the current position of the cursor.

Figure 18C:
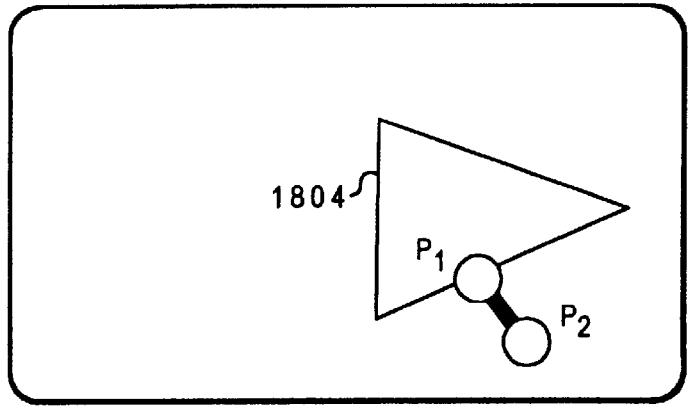
Figure 18D:
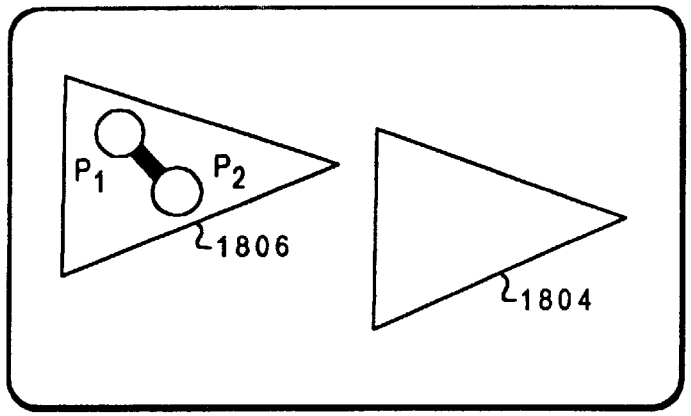

Then, in FIG. 18c, when the object 1804 is clicked at pointing spot $P_1$, the object is registered as the object to be processed. At the same time, the clicking of the mouse cursor at pointing spot $P_1$ causes the COPY flag to assume 1 to select a copying operation. Subsequently, as shown in FIG. 18c, the clicking of the mouse produces a copy of object 1804 at the current position of the cursor, thereby generating a new object 1806. Although not shown in the drawings, character "C" may be represented at pointing spot $P_1$ of the cursor 1802 and character "M" at pointing spot $P_2$ so as to clarify the copying and moving operations, respectively.

3. Selection of Angle

As shown in FIGS. 19a, 19b, 19c, and 19d, where line portions AB and BC determine angle $\alpha$ and $\beta$, merely clicking line portions AB and BC in sequence cannot clearly distinguish which angle should be selected when a one-point mouse cursor is utilized to draw a bisector of a selected angle. Thus it is possible to conceive of a technique of designating an angle clockwise from the line portion initially clicked followed by designating an angle to the line portion clicked afterwards. However, when the line portion is complicated, it is very difficult for an operator to designate the order of clicking line portions without error.

Figure 20:
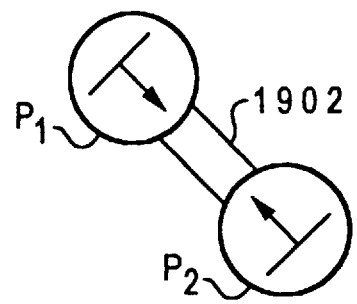
FIG. 20 depicts in detail a multiple-pointing-spot cursor used in the operation illustrated in FIG. 19.
Figure 19A:
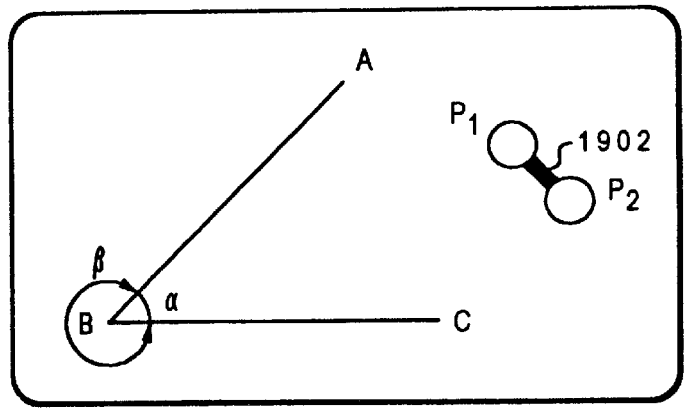
FIGS. 19a, 19b, 19c, and 19d illustrate steps of a bisector operation using a multiple-pointing-spot cursor.

Then, in accordance with the present invention, the double-point cursor 1902 is used, as illustrated in FIG. 19a. In such a case, each pointing spot $P_1$ and $P_2$ preferably represent an arrow indicating the designation direction as shown in FIG. 20.

Figure 19B:
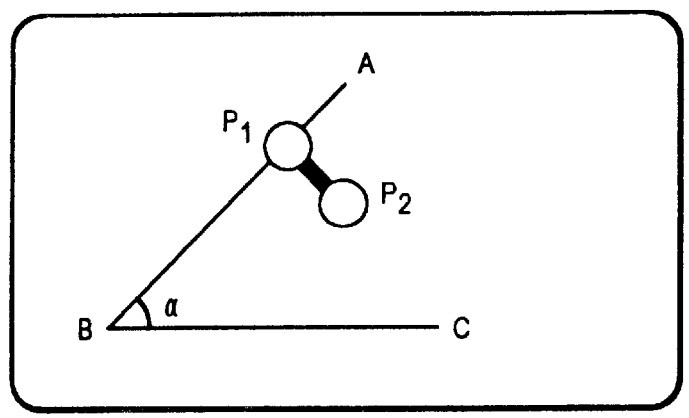
Figure 19C:
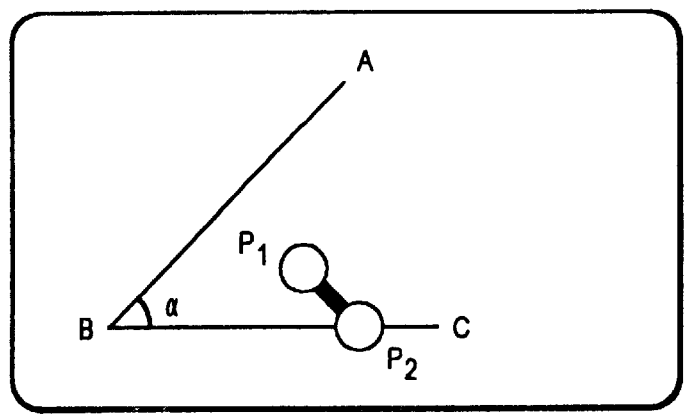
Figure 19D:
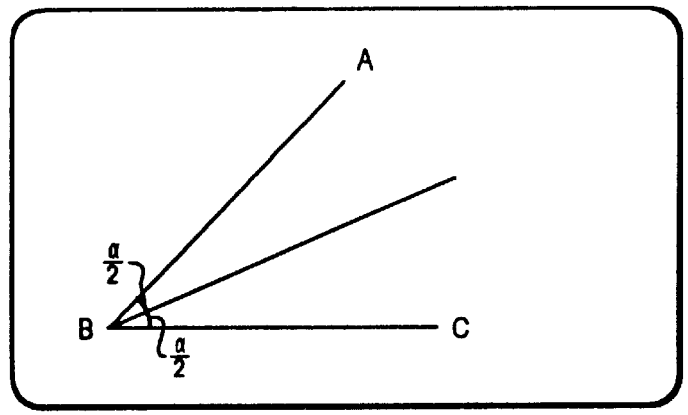

In FIG. 19b, line portion AB is clicked with pointing spot $P_1$. In FIG. 19c, the click of line portion BC allows selecting an angle $\alpha$ to give a bisector of the angle shown in FIG. 19d. Incidentally, even when the line portion BC is initially clicked with the pointing spot $P_2$ followed by clicking the line portion AB with the pointing spot $P_1$, the result is the same. The flowchart of this operation may be the same as the counterpart shown in FIG. 15. Thus explanation thereof is omitted here.

4. Other Application Examples

In addition to the above applications, the following applications can be considered.

(1) The double-point cursor may be used to select an object with one pointing spot and execute the object with another pointing spot (in place of double clicking).

(2) The double-point cursor may be used to select a single object with one pointing spot and then to select a plurality of objects with the other pointing spot. For a plurality of selected objects, batch deletion, batch printing, and batch editing are possible.

(3) The triple-point cursor may be used to minimize the window with one pointing spot whereas the other triple-point cursor is used to maximize the window. The remaining pointing spot is used to restore the window.

(4) In a text editing application, the double-point cursor may be used to designate the initiation of input for insertion with one pointing spot and the initiation of input for replacement with another pointing spot.

(5) In a text editing application, each pointing spot in the n-point cursor may be used for setting the Roman alphabet input mode, Kana input mode, full-size alphanumeric input mode, and half-size alphanumeric input mode, and half-size Kana input mode.

(6) In a text editing application, for such operations as move, copy, and change of attributes, a line unit may be selected with one pointing spot and a character unit is selected with the other pointing spot.

(7) In a text editing application, each pointing spot in the n-point cursor may be used for the selection of different fonts such as Gothic, Courier, and Elite.

(8) In a figure and graphic editing application, the double-point cursor may be used to move an object in parallel with one pointing spot and to rotate and move an object with the other pointing spot.

(9) In a figure and graphic editing application, the double-point cursor may be used to rotate an object through a voluntary angle with one pointing spot and to invert an object by a specific angle.

(10) In a figure and graphic application, when two overlapping objects are present, a two-point cursor may be used to arrange one pointing spot before the lower object and the other pointing spot behind the upper object.

(11) In a figure and graphic editing application, the n-point cursor may be used to change the attributes of figures such as thickness of lines, kinds of line, paint patterns of surfaces, and colors.

(12) In a figure and graphic editing application, a triple-point cursor may be used to select pointing spots, lines and surfaces on each line.

(13) In a figure and graphic editing application, a double-point cursor may be used to designate two parallel line portions at each pointing spot. (The length of the line portion clicked at the second pointing spot is changed so as to agree with the length of the line portion clicked at the first pointing spot.)

(14) In a figure and graphic editing application, a double-point cursor may be used to designate two line portions whose lengths are to be matched at each pointing spot. (The line portion clicked at the second pointing spot is changed so as to agree with the length of the line portion clicked at the first pointing spot.)

(15) In a figure and graphic editing application, a double-point cursor may be used to designate two angles whose degrees are to be matched at each pointing spot. (The degree of the angle clicked at the second pointing spot is changed so as to agree with the angle clicked at the first pointing spot.)

(16) In a figure and graphic editing application, a double-point cursor may be used to designate two pointing spotting spots of objects to be overlapped at each pointing spot. (The object clicked with the second pointing spot is moved so as to agree with the object clicked at the first pointing spot.)

(17) In a figure and graphic editing application, a two-point cursor may be used to designate a line portion with one pointing spot and a surface with the other pointing spot to designate an angle between the line portion and the surface (in a three-dimensional case).

(18) In a figure and graphic editing application, a two-point cursor may be used to designate a surface with one pointing spot and another surface with the other pointing spot to designate an angle between the two surfaces (in a three-dimensional case).

A mouse has been outlined as a pointing device in the above explanation. However, the present invention is not limited only to a mouse as a pointing device. It is to be understood that the invention can be applied to a system having a voluntary pointing device—such as a track ball or joy stick—with a cursor that cooperatively moves on a screen.

In addition, although the above embodiment uses established API such as MS-DOS and OS/2, it is possible for a creator of application programs to follow the teachings of the invention to prepare a unique routine for controlling a mouse cursor. In such a case, it is possible to prepare a mouse cursor having a sufficient size to apply the cursor to applications, which is more advantageous for the multiple-point cursor.

Advantages of the invention

As described above, the present invention uses a multiple-point cursor to click an object utilizing different pointing spots as needed, thereby enabling an operator to execute a desired operation with a minimum of operating steps, and without requiring complicated mouse operations such as double clicking and dragging.

What is claimed is:

1. A method in a data processing system for efficiently processing data utilizing a cursor, said method comprising the steps of:

displaying an object on a display coupled to said data processing system, said object being defined by x-y coordinates;

displaying, on said display, a multiple-point cursor having at least first and second pointing spots; and in response to a single user indication, performing a first operation on said object only if said first pointing spot of said multiple-point cursor is positioned at x-y coordinates defined to be within said object on said display, and performing a second operation on said object only if said second pointing spot of said multiple-point cursor is positioned at x-y coordinates defined to be within said object on said display.

2. The method in a data processing system for efficiently processing data utilizing a cursor according to claim 1, said method further including the step of positioning said first spot of said multiple-point cursor at x-y coordinates defined to be within said object on said display in response to manipulation of a pointing device.

3. The method in a data processing system for efficiently processing data utilizing a cursor according to claim 2, wherein said pointing device is a mouse, and wherein the step of positioning said first spot of said multiple-point cursor at x-y coordinates defined to be within said object on said display in response to manipulation of a pointing device includes positioning said first spot of said multiple-point cursor at x-y coordinates defined to be within said object on said display in response to manipulation of said mouse.

4. The method in a data processing system for efficiently processing data utilizing a cursor according to claim 3, wherein said mouse includes a mouse button, and wherein said step of performing a first operation on said object in response to a user indication while said first pointing spot of said multiple-point cursor is positioned at x-y coordinates defined to be within said object on said display includes performing a first operation on said object in response to a user clicking said mouse button while said first pointing spot of said multiple-point cursor is positioned at x-y coordinates defined to be within said object on said display.

5. The method in a data processing system for efficiently processing data utilizing a cursor according to claim 1, wherein said step of performing a first operation on said object in response to a user indication while said first pointing spot of said multiple-point cursor is positioned at x-y coordinates defined to be within said object on said display includes performing a copy operation on said object in response to a user indication while said first pointing spot of said multiple-point cursor is positioned at x-y coordinates defined to be within said object on said display.

6. The method in a data processing system for efficiently processing data utilizing a cursor according to claim 1, wherein said step of performing a first operation on said object in response to a user indication while said first pointing spot of said multiple-point cursor is positioned at x-y coordinates defined to be within said object on said display includes performing a move operation on said object in response to a user indication while said first pointing spot of said multiple-point cursor is positioned at x-y coordinates defined to be within said object on said display.

7. The method in a data processing system for efficiently processing data utilizing a cursor according to claim 1, said method further including the steps of:
   indicating within said display said first operation to be performed in response to said indication operation while said first pointing spot is positioned at x-y coordinates defined to be within said object; and
   indicating within said display said second operation to be performed in response to said indication operation while said second pointing spot is positioned at x-y coordinates defined to be within said object.

8. The method in a data processing system for efficiently processing data utilizing a cursor according to claim 7, wherein said step of indicating within said display said first operation to be performed in response to said indication operation while said first pointing spot is positioned at x-y coordinates defined to be within said object further includes indicating, near said first pointing spot, said first operation to be performed in response to said indication operation while said first pointing spot is positioned at x-y coordinates defined to be within said object.

9. A method in a data processing system for efficiently processing data utilizing a cursor, said method comprising the steps of:
   displaying first and second objects on a display coupled to said data processing system;
   displaying, on said display, a multiple-point cursor having at least first and second pointing spots, said object being defined by x-y coordinates;
   registering said first object as a first selected object in response to a user indication operation and said first pointing spot being positioned at x-y coordinates defined to be within said first object;
   registering said second object as a second selected object in response to said user indication operation and said second pointing spot being positioned at x-y coordinates defined to be within said second object; and
   performing an operation on said first and second selected objects in response to said registration of said first and second objects.

10. The method in a data processing system for efficiently processing data utilizing a cursor according to claim 9, and further including the step of positioning said first spot in said multiple-point cursor at x-y coordinates defined to be within said first object on said display in response manipulation of a pointing device.

11. The method in a data processing system for efficiently processing data utilizing a cursor according to claim 10, wherein said pointing device includes a mouse, and wherein the step of positioning said first spot in said multiple-point cursor at x-y coordinates defined to be within said first object on said display in response to manipulation of a pointing device includes positioning said first spot in said multiple-point cursor at x-y coordinates defined to be within said first object on said display in response to manipulation of said mouse.

12. The method in a data processing system for efficiently processing data utilizing a cursor according to claim 11, wherein said mouse includes a mouse button, and wherein said step of registering said first object as a first selected object in response to a user indication operation and said first pointing spot being positioned at x-y coordinates defined to be within said first object includes registering said first object as a first selected object in response to a user clicking said mouse button while said first pointing spot is positioned at x-y coordinates defined to be within said first object.

13. The method in a data processing system for efficiently processing data utilizing a cursor according to claim 9, wherein said first and second selected objects include first and second selected lines, and wherein the step of performing an operation on said first and second selected objects in response to said registration of said first and second objects includes bisecting said first selected line with said second selected line in response to said registration of said first and second selected lines.

14. The method in a data processing system for efficiently processing data utilizing a cursor according to claim 9, wherein said first and second selected objects include first and second selected lines that form an angle $\alpha$, and wherein said step of performing an operation on said first and second selected objects in response to said registration of said first and second objects includes drawing a bisector of said angle $\alpha$ in response to said registration of said first and second selected lines.

15. The method in a data processing system for efficiently processing data utilizing a cursor according to claim 9, said method further including the steps of:
   indicating within said display said operation to be performed on said first selected object; and
   indicating within said display said operation to be performed on said second selected object.

16. The method in a data processing system for efficiently processing data utilizing a cursor according to claim 15, wherein said step of indicating within said display said operation to be performed further includes indicating near said first pointing spot said operation to be performed on said first selected object.

17. A data processing system for efficiently processing data utilizing a cursor, said data processing system comprising:
   a display coupled to said data processing system for displaying an object, said object being defined by x-y coordinates;
   means for displaying, on said display, a multiple-point cursor having at least first and second pointing spots;
   means for performing a first operation on said object in response to a user indication only if said first pointing spot of said multiple-point cursor is positioned at x-y coordinates defined to be within said object on said display; and
   means for performing a second operation on said object in response to said user indication only if said second pointing spot of said multiple-point cursor is positioned at x-y coordinates defined to be within said object on said display.

18. The data processing system for efficiently processing data utilizing a cursor according to claim 17, and further including a pointing device for positioning said first spot in said multiple-point cursor at x-y coordinates defined to be within said object on said display.

19. The data processing system for efficiently processing data utilizing a cursor according to claim 18, wherein said pointing device is a mouse, and wherein said means for positioning said first spot in said multiple-point cursor at x-y coordinates defined to be within said object on said display includes means for positioning said first spot in said multiple-point cursor at x-y coordinates defined to be within said object on said display utilizing said mouse.

20. The data processing system for efficiently processing data utilizing a cursor according to claim 19, wherein said mouse includes a mouse button, and wherein said means for performing a first operation on said object in response to a user indication while said first pointing spot of said multiple-point cursor is positioned at x-y coordinates defined to be within said object on said display includes means for performing a first operation on said object in response to a user clicking said mouse button while said first pointing spot of said multiple-point cursor is positioned at x-y coordinates defined to be within said object on said display.

21. The data processing system for efficiently processing data utilizing a cursor according to claim 17, wherein said means for performing a first operation on said object in response to a user indication while said first pointing spot of said multiple-point cursor is positioned at x-y coordinates defined to be within said object on said display includes means for performing a copy operation on said object in response to a user indication while said first pointing spot of said multiple-point cursor is positioned at x-y coordinates defined to be within said object on said display.

22. The data processing system for efficiently processing data utilizing a cursor according to claim 17, wherein said means for performing a first operation on said object in response to a user indication while said first pointing spot of said multiple-point cursor is positioned at x-y coordinates defined to be within said object on said display includes means for performing a move operation on said object in response to a user indication while said first pointing spot of said multiple-point cursor is positioned at x-y coordinates defined to be within said object on said display.

23. The data processing system for efficiently processing data utilizing a cursor according to claim 17, and further including:

means for indicating within said display said first operation to be performed in response to said indication operation while said first pointing spot is positioned at x-y coordinates defined to be within said object; and means for indicating within said display said second operation to be performed in response to said indication operation while said second pointing spot is positioned at x-y coordinates defined to be within said object.

24. The data processing system for efficiently processing data utilizing a cursor according to claim 23, wherein said means for indicating within said display said first operation to be performed in response to said indication operation while said first pointing spot is positioned at x-y coordinates defined to be within said object further includes means for indicating, near said first pointing spot, said first operation to be performed in response to said indication operation while said first pointing spot is positioned at x-y coordinates defined to be within said object.

* * * * *